June 20, 1939.  C. A. VAN DERVEER  2,163,359
SEAT BACK AND THE LIKE AND METHOD OF FORMING
Filed Aug. 7, 1937  2 Sheets-Sheet 1
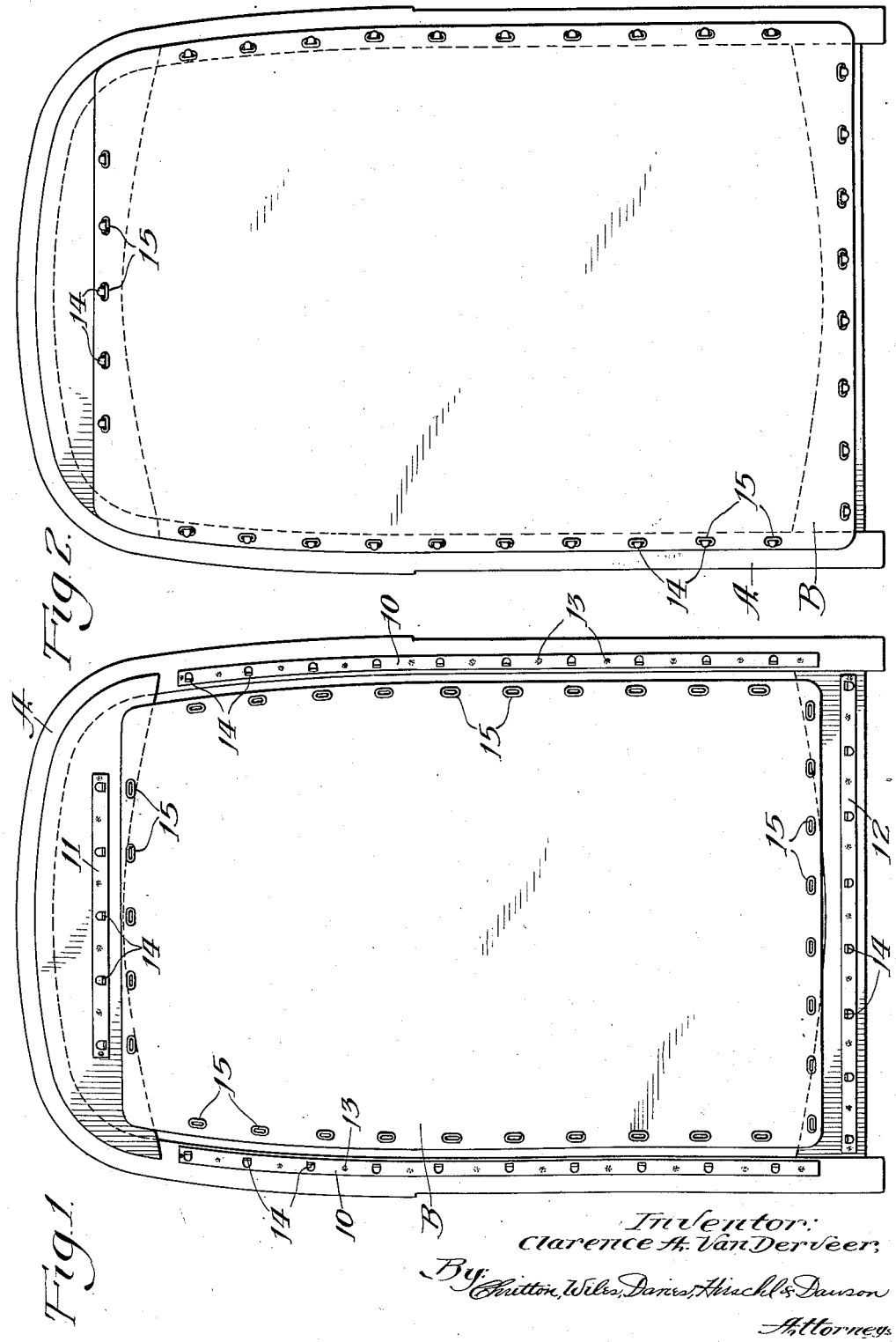

June 20, 1939.  C. A. VAN DERVEER  2,163,359
SEAT BACK AND THE LIKE AND METHOD OF FORMING
Filed Aug. 7, 1937   2 Sheets-Sheet 2
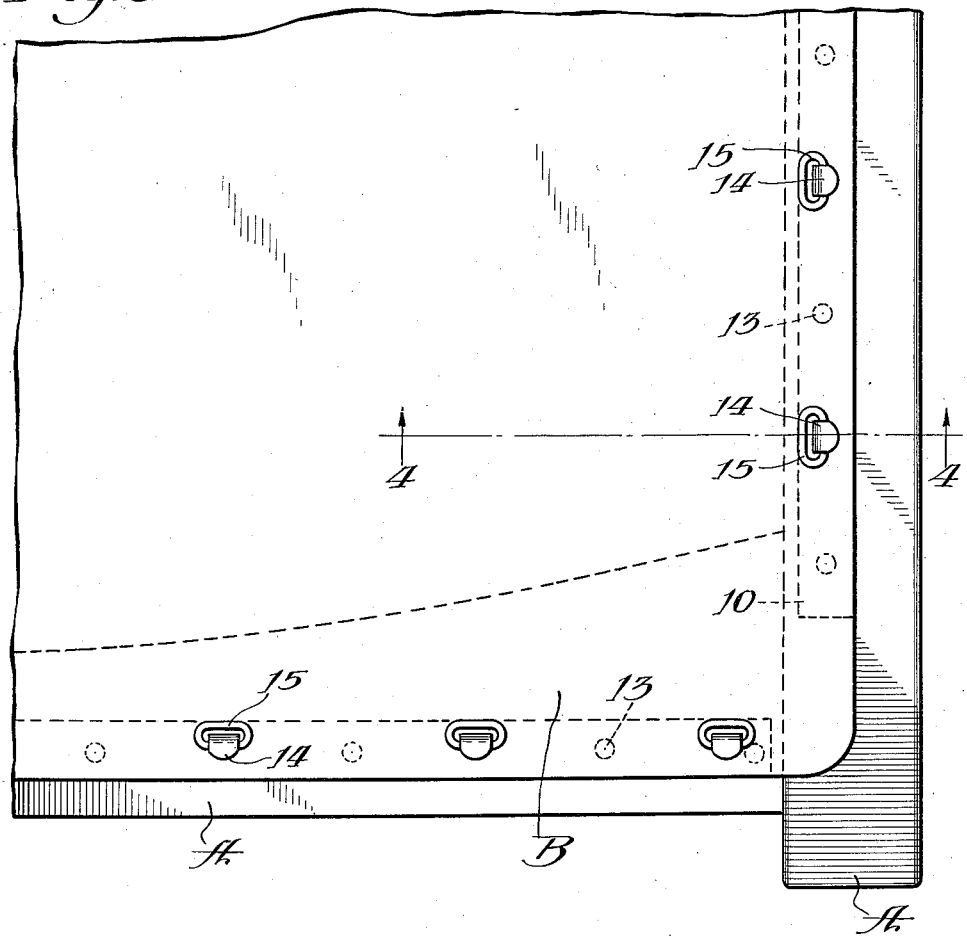
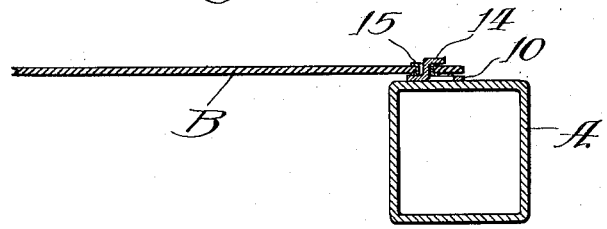
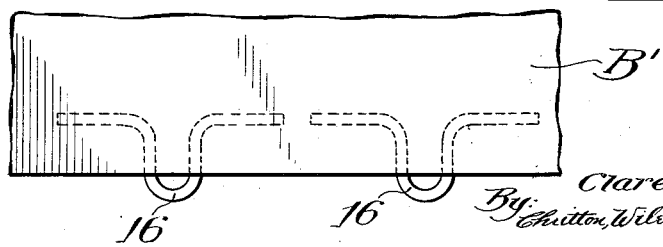
Inventor:
Clarence A. Van Derveer,
By Chritton, Wiles, Davies, Hirsch & Dawson,
Attorneys Patented June 20, 1939

2,163,359

UNITED STATES PATENT OFFICE 2,163,359

SEAT BACK AND THE LIKE AND METHOD OF FORMING

Clarence A. Van Derveer, Chicago, Ill., assignor to S. Karpen & Bros., a corporation of Illinois Application August 7, 1937, Serial No. 157,963

2 Claims. (Cl. 155—187)

This invention relates to a seat back and the method of forming or assembling same. It will be understood that the method and means may be employed in connection with other seat structures.

An object of the invention is to provide simple and inexpensive mechanism for forming a seat structure, and means by which the structure can be assembled in an extremely brief time. Other specific objects and advantages will appear as the specification proceeds.

The invention is illustrated, in a preferred embodiment, by the accompanying drawings, in which—

Fig. 1 is a view in elevation of a seat back, the parts being shown before assembly; Fig. 2, a view similar to Fig. 1, but showing the structure fully assembled; Fig. 3, an enlarged broken view in elevation, illustrating details of construction; Fig. 4, a sectional view, the section being taken as indicated at line 4 of Fig. 3; and Fig. 5, a modified form of the invention.

In the illustration given in Figs. 1 to 4, inclusive, a seat back is shown equipped with an elastic or stretchable lining or sheet material. The seat back is illustrative of other structures to which the invention is applicable.

A designates a seat back frame, which may be formed of metal or other suitable material. To the metal is secured, by spot welding or other suitable means, vertical metal strips 10, an upper metal strip 11, and a lower or bottom strip 12. The spot welding is indicated by the numeral 13.

The plates 10, 11 and 12 are provided with spaced clamping lugs 14, which are preferably formed by striking them from the metal plate itself. Preferably, the plates are formed of a malleable metal which will permit the lugs later to be hammered or pressed to a permanently closed or locking position.

B designates the lining or sheet member, which is preferably of some suitably strong and elastic material. I have found that rubber, reinforced with fabric or cords, provides a sturdy backing which will not stretch too far, but which will, at the same time, permit the parts to be assembled, as later described. Fabric or cord reinforced rubber is of well known construction and need not be described in detail.

I provide the fabric reinforced rubber sheet B at spaced intervals with openings, in which are secured metal eyelets 15. The eyelets are so spaced that while initially, as shown in Fig. 1, the eyelets are out of alignment with the lugs 14, the alignment is produced when the sheet is stretched to the final position illustrated in Fig. 2.

In the operation of assembly, which requires but a moment of time, the eyelets 15 are placed about the lugs 14 at either end, and the remainder of the fabric is stretched so that the eyelets are brought into the position illustrated in Fig. 2, in which each is engaged by one of the malleable lugs 14. As soon as this very rapid assembly has been completed, the lugs 14 may be hammered or pressed to a position in which they rigidly and permanently clamp the fabric-reinforced sheet against the frame A.

In the modification shown in Fig. 5, the elastic sheet B' is shown equipped with loops 16, formed by stitching cord, wire, or other suitable members within or upon the fabric body and near its edge. The loops thus provided are adapted to be inserted over the hooks or clamping lugs 14 in the same manner as eyelets 15 were placed in position; and after this has been done, the clamping lugs are pressed downwardly to form a permanent locking of the sheet to the frame A.

The method and mechanism is extremely simple, and requires much less time to bring about an assembly than prior methods and means. The resulting seat structure maintains a taut and trim-looking seat back, while at the same time providing a yielding support, the extent of yielding being limited by the fabric or cord reinforcement.

With the seat back assembled, as illustrated, it will be understood that other members, such as cushions, etc., may be added to the frame over the sheeting described. Because such cushions, etc., are of well known construction, no further description is given herein, and it will be understood that, if desired, such cushion structures may be entirely omitted.

While, in the foregoing description, I have specified a seat back and the method of forming the same, it will be understood that such description is for the purpose of illustration only, and that the invention is readily applicable to other portions of seat and like structures.

The foregoing detailed description has been given for clearness of understanding only and no unnecessary limitations should be understood therefrom, but the appended claims should be construed as broadly as permissible in view of the prior art.

I claim:

1. A seat structure comprising a perimetric frame, a series of lugs in spaced relation carried by the top portion of said frame, a series of spaced lugs carried by each of the sides of said frame and a series of lugs extending in spaced relation across the bottom portion of said frame, and an elastic sheet normally smaller than the area extending between said lugs, the edges of said sheet being equipped with means for engaging said lugs when the sheet is stretched to fill the area between said lugs, the spacing between said means upon said sheet being smaller than the spacing between the corresponding lugs upon said frame until said sheet is stretched.

2. A seat structure comprising a perimetric frame, a series of lugs in spaced relation carried by an opposed pair of sides, and an elastic sheet normally smaller than the area extending between said lugs, the edges of said sheet being equipped with means for engaging said lugs when the sheet is stretched to fill the area between the lugs, the spacing between said means upon said sheet being smaller than the spacing between the corresponding lugs upon said frame until said sheet is stretched.

CLARENCE A. VAN DERVEER.